US011290704B2

(12) United States Patent
Kang et al.

(10) Patent No.: US 11,290,704 B2
(45) Date of Patent: Mar. 29, 2022

(54) THREE DIMENSIONAL SCANNING SYSTEM AND FRAMEWORK

(71) Applicant: Hewlett-Packard Development Company, L.P., Houston, TX (US)

(72) Inventors: Jinman Kang, San Diego, CA (US); Ben Wynne, San Diego, CA (US); David Bradley Short, San Diego, CA (US); Christopher S Tanner, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 894 days.

(21) Appl. No.: 15/500,557

(22) PCT Filed: Jul. 31, 2014

(86) PCT No.: PCT/US2014/049246
§ 371 (c)(1),
(2) Date: Jan. 31, 2017

(87) PCT Pub. No.: WO2016/018392
PCT Pub. Date: Feb. 4, 2016

(65) Prior Publication Data
US 2017/0223338 A1 Aug. 3, 2017

(51) Int. Cl.
*H04N 13/25* (2018.01)
*H04N 13/246* (2018.01)
(Continued)

(52) U.S. Cl.
CPC .......... *H04N 13/25* (2018.05); *G01B 11/002* (2013.01); *G01B 11/24* (2013.01); *G06T 7/55* (2017.01);
(Continued)

(58) Field of Classification Search
CPC ....... G06T 17/00; G06T 7/73; G06T 2200/08; G06T 7/55; G06T 1/0007;
(Continued)

(56) References Cited

U.S. PATENT DOCUMENTS 6,628,819 B1 * 9/2003 Huang .................... G06T 7/579
345/419
7,363,157 B1 * 4/2008 Hanna .................... G01C 11/00
702/5

(Continued)

OTHER PUBLICATIONS

Chen Chao and I. Stamos, "Semi-automatic range to range registration: a feature-based method," Fifth International Conference on 3-D Digital Imaging and Modeling (3DIM'05), Ottawa, Ontario, Canada, 2005, pp. 254-261 (Year: 2005).*

(Continued)

Primary Examiner — Daniel Chang
(74) Attorney, Agent, or Firm — Fabian VanCott

(57) ABSTRACT

A method and corresponding system for reconstructing the surface geometry of a three-dimensional object is disclosed. The system comprises a cluster of heterogeneous sensors, including a two-dimensional high-resolution camera and a three-dimensional depth camera, and a turntable operable to rotate incrementally. In operation, the turntable is rotated to first and second positions and two-dimensional and three-dimensional data sets are obtained using the two-dimensional high-resolution camera and the three-dimensional depth camera. Corresponding features from the two-dimensional data sets are identified and used to identify the same corresponding features in the three-dimensional data sets. The three-dimensional corresponding features are used to calculate a three-dimensional homography, which is used to align the three-dimensional data sets. Following alignment, a three-dimensional mesh is generated from the aligned data sets.

20 Claims, 6 Drawing Sheets

(51) Int. Cl.

| | |
|---|---|
| *G01B 11/00* | (2006.01) |
| *G01B 11/24* | (2006.01) |
| *G06T 7/80* | (2017.01) |
| *G06T 7/55* | (2017.01) |
| *G06T 7/593* | (2017.01) |
| *H04N 13/207* | (2018.01) |
| *H04N 13/271* | (2018.01) |
| *H04N 13/00* | (2018.01) |

(52) U.S. Cl.
CPC ............... *G06T 7/593* (2017.01); *G06T 7/80* (2017.01); *H04N 13/246* (2018.05); *G06T 2207/10024* (2013.01); *G06T 2207/10028* (2013.01); *H04N 13/207* (2018.05); *H04N 13/271* (2018.05); *H04N 2013/0081* (2013.01); *H04N 2213/003* (2013.01)

(58) Field of Classification Search
CPC . G06T 2207/10012; G06T 15/04; G06T 7/38; G06T 7/30; H04N 13/246; H04N 13/204; H04N 13/10; H04N 13/106; H04N 13/271
USPC ........ 348/37, 46–48; 382/106, 154; 345/419
See application file for complete search history.

(56) References Cited

U.S. PATENT DOCUMENTS

| | | | |
|---|---|---|---|
| 7,599,561 B2 | 10/2009 | Wilson et al. | |
| 7,710,391 B2 | 5/2010 | Bell et al. | |
| 7,835,568 B2* | 11/2010 | Park | G06T 17/10 |
| | | | 382/154 |
| 8,121,640 B2 | 2/2012 | Russ et al. | |
| 8,199,117 B2 | 6/2012 | Izadi et al. | |
| 8,416,236 B1 | 4/2013 | Hickman et al. | |
| 8,736,583 B2 | 5/2014 | Anderson et al. | |
| 9,519,968 B2 | 12/2016 | Kang | |
| 2003/0058242 A1* | 3/2003 | Redlich | G06T 17/10 |
| | | | 345/427 |
| 2003/0066949 A1 | 4/2003 | Mueller et al. | |
| 2003/0202691 A1* | 10/2003 | Beardsley | G06T 7/85 |
| | | | 382/154 |
| 2005/0078092 A1 | 4/2005 | Clapper | |
| 2006/0193179 A1 | 8/2006 | England et al. | |
| 2007/0031064 A1* | 2/2007 | Zhao | G06T 7/33 |
| | | | 382/285 |
| 2008/0018591 A1 | 1/2008 | Pittel et al. | |
| 2008/0075324 A1* | 3/2008 | Sato | H04N 13/207 |
| | | | 382/106 |
| 2008/0112610 A1* | 5/2008 | Israelsen | G06T 17/00 |
| | | | 382/154 |
| 2008/0310757 A1* | 12/2008 | Wolberg | G06K 9/00208 |
| | | | 382/285 |
| 2009/0304265 A1* | 12/2009 | Khan | G06T 15/205 |
| | | | 382/154 |
| 2011/0025827 A1* | 2/2011 | Shpunt | H04N 5/33 |
| | | | 348/47 |
| 2011/0115886 A1* | 5/2011 | Nguyen | G06T 5/003 |
| | | | 348/47 |
| 2011/0205341 A1 | 8/2011 | Wilson et al. | |
| 2011/0242054 A1 | 10/2011 | Tsu | |
| 2011/0274366 A1* | 11/2011 | Tardif | G06T 5/002 |
| | | | 382/260 |
| 2011/0310037 A1 | 12/2011 | Moran et al. | |
| 2012/0056982 A1* | 3/2012 | Katz | G06T 7/521 |
| | | | 348/43 |
| 2012/0081544 A1* | 4/2012 | Wee | G01S 17/931 |
| | | | 348/140 |
| 2012/0293635 A1* | 11/2012 | Sharma | G06K 9/00234 |
| | | | 348/50 |
| 2012/0306876 A1 | 12/2012 | Shotton et al. | |
| 2012/0320158 A1* | 12/2012 | Junuzovic | G06Q 10/101 |
| | | | 348/46 |
| 2013/0010077 A1 | 1/2013 | Nguyen et al. | |
| 2013/0010079 A1 | 1/2013 | Zhang et al. | |
| 2013/0077236 A1 | 3/2013 | Becze et al. | |
| 2014/0139639 A1 | 5/2014 | Wagner et al. | |
| 2014/0160123 A1* | 6/2014 | Yang | G06T 17/00 |
| | | | 345/420 |
| 2014/0168367 A1 | 6/2014 | Kang | |
| 2015/0287242 A1* | 10/2015 | Kim | G06T 17/20 |
| | | | 345/420 |
| 2017/0213386 A1 | 7/2017 | Kang | |

OTHER PUBLICATIONS

Dellen et al, "Volume Measurement with a Consumer Depth Camera Based on Structured Infrared Light," Institut de Robotica I Informatica Industrial, 2013, pp. 1-10.

Pagliari et al., "Kinect Fusion Improvement Using Depth Camera Calibration," ISPRS Technical Commission V Symposium, V, XL-5, 2014, 479-485.

Shahram Izadi et al., "C-Slate: A Multi-Touch and Object Recognition System for Remote Collaboration using Horizontal Surfaces,", 2007, pp. 3-10, IEEE.

* cited by examiner

THREE DIMENSIONAL SCANNING SYSTEM AND FRAMEWORK

BACKGROUND

Three-dimensional computer models of real-world objects are used or required in many applications, such as engineering prototyping. Three-dimensional (3D) reconstruction is the process of determining the shape or appearance of the real world objects under consideration. Data or images of an object taken using heterogeneous sensors (e.g., different types of cameras) may be used to perform the reconstruction process. Reliability, repeatability, resolution, accuracy and speed considerations are, however, generally critical to the construction and operation of scanners or digitizers used to generate the models of the real world objects being examined. The disclosure herein describes a cluster of heterogeneous sensors and a turntable that can be used efficiently and robustly in the process of 3D reconstruction of real world objects.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements. The examples shown in the figures and described below illustrate, but do not limit, the invention, which is defined in the Claims following the below Description.

DETAILED DESCRIPTION

Figure 1:
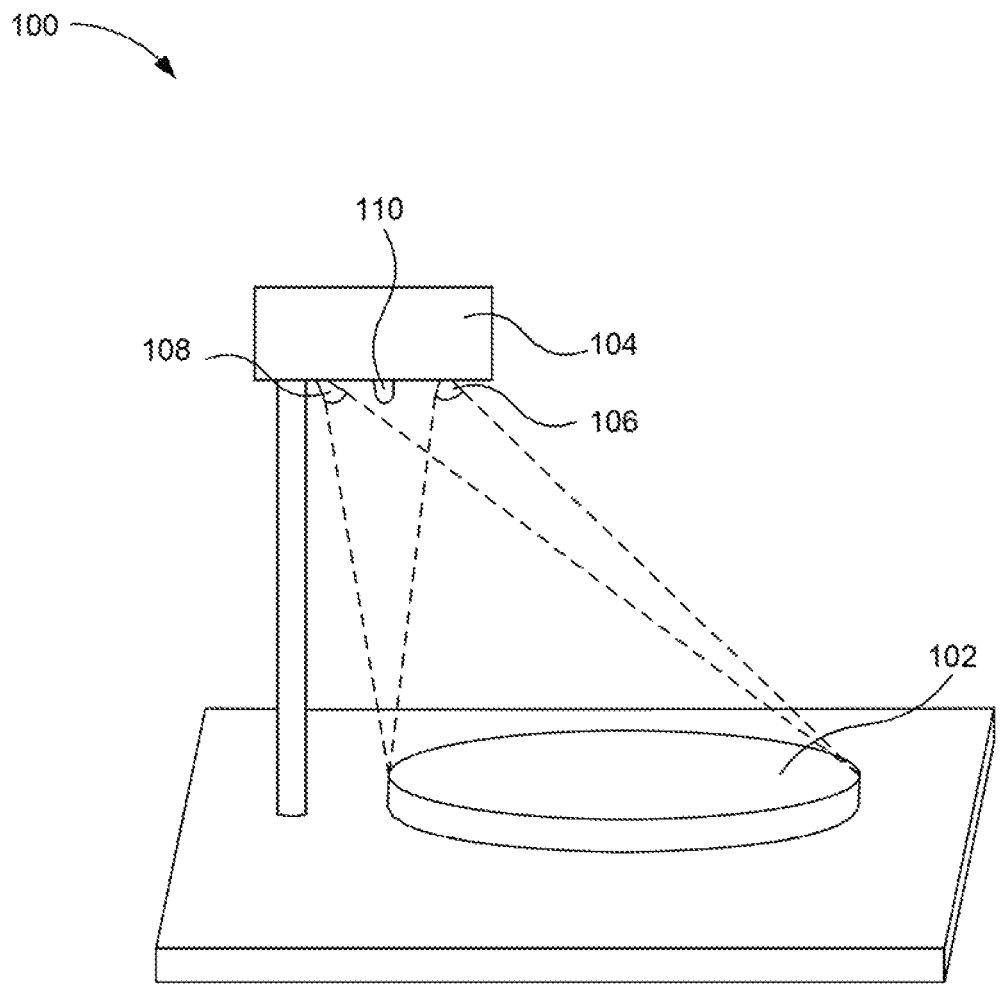
FIG. 1 is a perspective view of a scanning system operating under the principles of the present invention, which includes a heterogeneous sensor cluster and a turntable.

Referring to FIG. 1, a 3D scanning system (100) incorporating the principles of the present invention is illustrated. The scanning system includes a turntable (102) and a heterogeneous sensor duster (104). The 3D scanning system (100) may also include a screen and input device or be operably connected to a computing device having a screen and keyboard, for example. The heterogeneous sensor duster (104) includes different types of visual sensors and enables the capture of richer and more robust information than can be obtained from a single camera or sensor. In some examples, as shown in FIG. 1, the visual sensors of the cluster (104) can include a depth camera (106) and a high-resolution camera (108). A projector (110) may also be included for illumination and calibration purposes. Other combinations of visual sensors can be employed.

In some examples, the depth camera (106) can capture visual data of a physical target, where the captured visual data can include the following: three-dimensional (3D) depth information (also referred to as a "depth map"), infrared (IR) image frames, and RGB image frames (which are image frames in the RGB color space). In other examples, the depth camera (106) can produce image frames in another color space. An "image frame" refers to a collection of visual data points that make up an image. Depth information refers to a depth of the physical target with respect to the depth camera (106); this depth information represents the distance between the physical target (or a portion of the physical target) and the depth camera (106).

In some examples, the depth camera (106) can include an IR visual sensor, an RGB visual sensor, and additional sensor(s) to allow the depth camera to capture the depth information as well as an RGB image frame and IR image frame. The RGB image frame captured by a depth camera can be a relatively low-resolution image frame. In other examples, the depth camera (106) can include other combinations of visual sensors that allow the depth camera (106) to capture depth information and visual data of a physical target in a visible color space.

The high-resolution color-space camera (108) of the cluster (104) can capture a higher-resolution RGB image frame (or image frame in other color space). In the following discussion, reference to "low-resolution" and "high-resolution" is in the context of relative resolutions between different visual sensors. In other words, a "high-resolution" visual sensor is able to capture visual data at a higher resolution than a "low-resolution" visual sensor. In some examples of systems based on the principles described herein, a high-resolution camera has pixel dimensions of approximately 4,000 by 3,000 pixels, while the depth camera has pixel dimensions of approximately 640 by 480 pixels.

Figure 2:
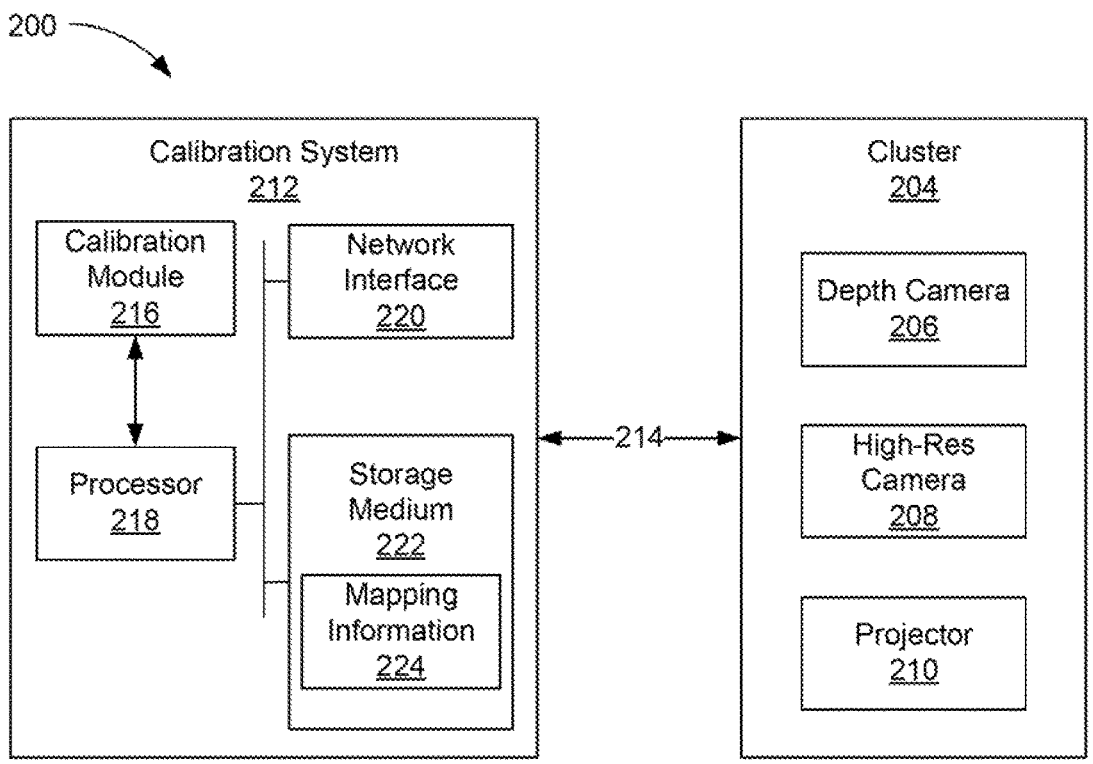
FIG. 2 is a schematic diagram of a 3D scanning system similar to the system described with respect to FIG. 1.

Referring to FIG. 2, a schematic diagram of a 3D scanning system (200) similar to the system described with respect to FIG. 1 is illustrated. The 3D scanning system (200) includes a duster (204) having a depth camera (206), a high-resolution camera (208) and a projector (210). The 3D scanning systems described herein benefit from calibration of the cameras in the sensor dusters prior to use. Accordingly, FIG. 2 also illustrates a calibration system (212) that is able to communicate over a link (214) with the various visual sensors of the cluster (204). The calibration system (212) includes a calibration module (216) that is able to perform calibration procedures according to some implementations for calibrating the visual sensors of the duster (204). In some examples, the calibration module (216) can be implemented as machine-readable instructions executable on one or multiple processors (218). In other examples, the calibration system (212) can be implemented as hardware.

The calibration system (212) also includes a network interface (220) to allow the calibration system (212) to communicate over a network, such as the link (214). Also, the calibration system (212) includes a storage medium (222) for storing data and instructions. The storage medium (222) can store mapping information (224), where the mapping information (224)—e.g., a known checkerboard pattern—relates to mappings between different pairs of the visual sensors of the cluster (204). The mapping information (224) is used to perform calibration among the visual sensors of the duster (204) and while generating 3D scanning information. Once the visual sensors of the duster (204) are calibrated, the visual data captured by the respective visual sensors can be properly combined to perform various tasks, such as tasks associated with 3D scanning or digitization.

System Calibration.

Prior to performing scanning operations using the 3D scanning systems described herein, the heterogeneous set of cameras or visual sensors is calibrated. Calibration of the system results in a projective mapping from a 3D point cloud to a 2D image and a homography between sets of 2D images and between sets of 3D point clouds. In one example, the projective mapping relates the 3D point clouds captured by the depth camera (106) to a 2D image of the points. Homographies, on the other hand, map 2D and 3D data in 2-space and 3-space, respectively, onto different 2D and 3D coordinate systems.

A projective mapping between 3D coordinates and a 2D plane or image can be defined by Eq. 1, below:

$$x = PX, \quad (\text{Eq. 1})$$

where x represents 2D coordinates and X represents 3D coordinates. More specifically, Eq. 1 can be written as $$\begin{bmatrix} u \\ v \\ 1 \end{bmatrix} = z_c \cdot K[Rt] \begin{bmatrix} x_w \\ y_w \\ z_w \\ 1 \end{bmatrix}, \quad (\text{Eq. 2})$$

Where $x = [u\ v\ 1]^T$ represents 2D coordinates, $X = [x_w\ y_w\ z_w\ 1]^T$ represents 3D coordinates, $z_c$ is an arbitrary scale (having a predefined value), K represents intrinsic parameters, R represents extrinsic rotation parameters, and t represents extrinsic translation parameters. The intrinsic parameters K are defined as follows:

$$K = \begin{bmatrix} f_x & s & u_0 \\ 1 & f_y & v_0 \\ 1 & 1 & 1 \end{bmatrix}, \quad (\text{Eq. 3})$$

Where $f_x$, $f_y$ represent focal lengths of a lens of the visual sensor, $u_0$, $v_0$ represent an optical center along an optical axis of the visual sensor, and s is a skew coefficient that represents skew distortion of the visual sensor.

The extrinsic rotation parameters (R) and extrinsic translation parameters (t) are part of the geometric parameters of a visual sensor. The rotation parameters can define the pan, tilt, and yaw of a visual sensor in geometric space. The translation parameters can define a translational position of the visual sensor in geometric space.

Deriving the projective matrix (P) involves computing the intrinsic parameters (K) and geometric parameters (R, t) of a visual sensor. Once obtained, the intrinsic parameters (K) and extrinsic rotation parameters (R) can be used to produce homography operators for mapping data between 2D images obtained by the sensors and different 2D spaces and 3D point clouds obtained by the sensors and different 3D spaces.

More specifically, a direct 2D-to-2D mapping between a pair of visual sensors can be represented by a 2D homography, such that x'=Hx, where x' and x are 2D position vectors in the two planes. The homography relates the pixel coordinates in two images (corresponding to two visual sensors). The 2D homography (H) can be represented by a 3-x-3 matrix, generally of the form:

$$H = \begin{bmatrix} H_{11} & H_{12} & H_{13} \\ H_{21} & H_{22} & H_{23} \\ H_{31} & H_{32} & H_{33} \end{bmatrix}. \quad (\text{Eq. 4})$$

The 3D counterpart is a 4×4 matrix, with x' and x being 3D position vectors in 3-space. Further details for calculating the components of the homography matrices, which are dependent upon the intrinsic and extrinsic parameters referred to above, can be found in commonly owned application Ser. No. 13/713,036 (entitled, "Calibrating Visual Sensors Using Homography Operators"), the disclosure of which is incorporated herein by reference.

System Operation.

Figure 3:
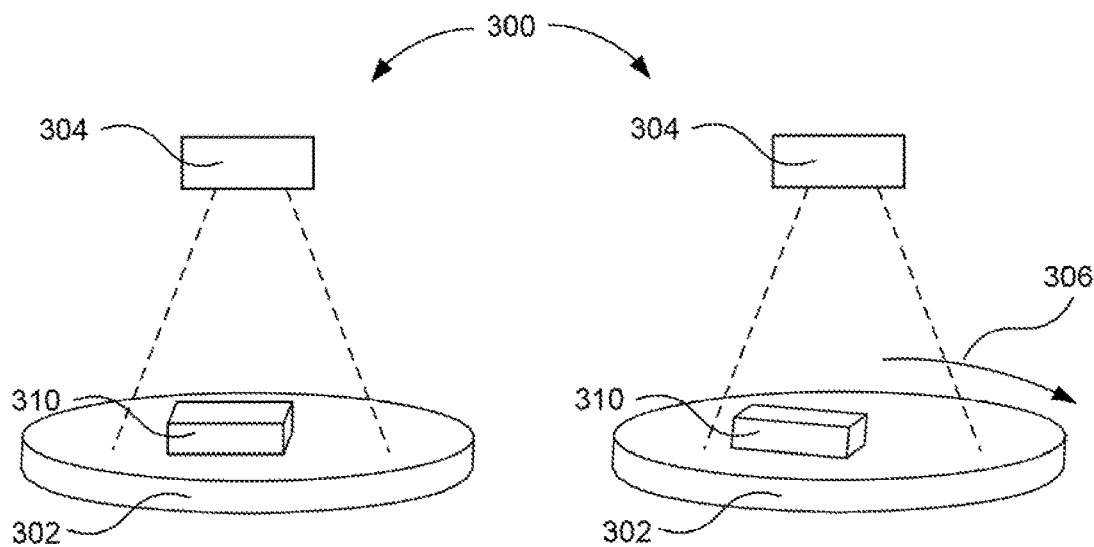
FIG. 3 illustrates an object to be scanned or digitized placed on a turntable and rotated a first increment in view of a sensor duster having a depth camera and high-resolution camera similar to those described and illustrated in FIGS. 1 and 2.

Referring to FIG. 3, an object (310) to be scanned or digitized is placed on a 3D scanning system (300) having a turntable (302) and a sensor cluster (304) having a depth camera and high-resolution camera similar to those described above. The turntable (302) is rotated to a first position and a first 3D point cloud is obtained using the depth camera and a first 2D high-resolution image is obtained using the high-resolution camera. The 3D point cloud comprises a set of 2D points (e.g., x and y coordinates) with a depth or distance (e.g., z coordinate) associated with each 2D point. The turntable (302) is then rotated a predetermined increment (306) (e.g., 10 degrees) to a second position and a second 3D point cloud and 2D high-resolution image are obtained using the depth camera and high-resolution camera, respectively. The data comprising the first and second point clouds and images may be stored in memory.

Figure 4:
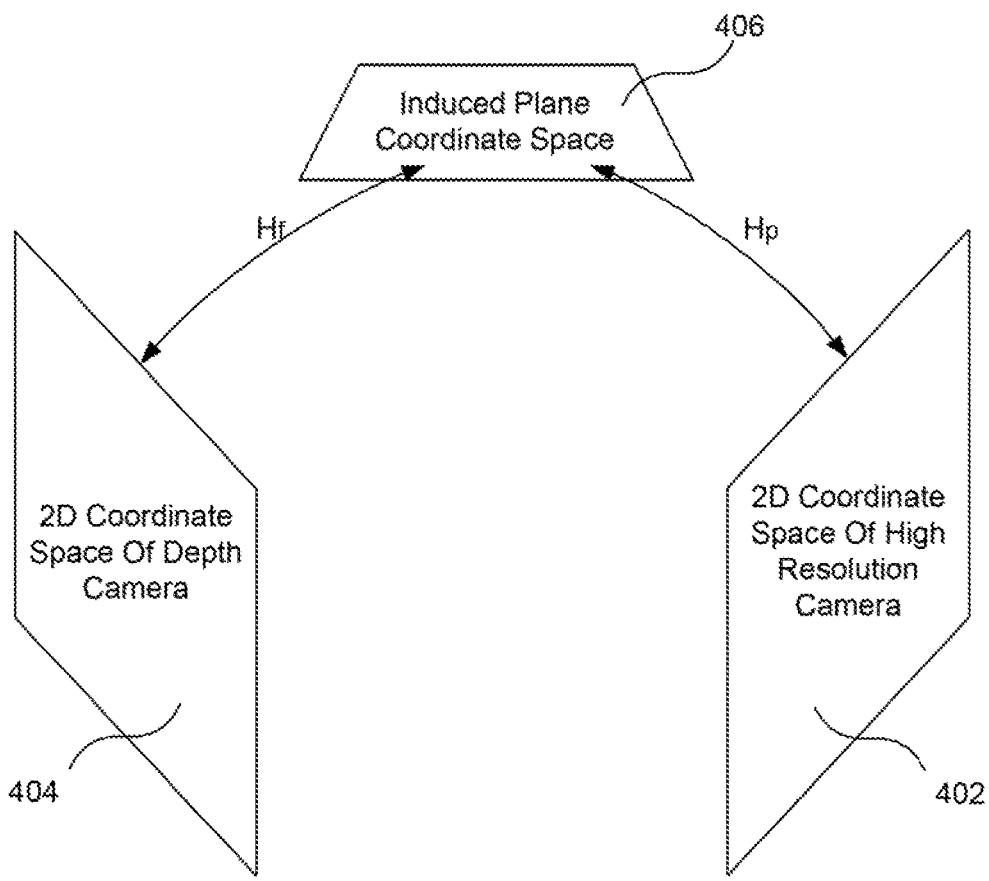
FIG. 4 illustrates various mappings between coordinate spaces representing depth camera and high-resolution camera image planes.

A 3D scanning (or digitization) is generated using the pairs of point clouds and images in the following manner. To begin, the first and second 2D high-resolution images are analyzed for corresponding points or features to obtain a first set of 2D high-resolution corresponding points, x. In one example, the number of high-resolution corresponding points is at least 18 in number. A multi-step 2D homography is then employed to map the first set of 2D high-resolution corresponding points, x, from the image plane of the high-resolution camera to the image plane of the depth camera, x". More specifically, referring to FIG. 4, a 2D coordinate space (402) representing the image plane of the high-resolution camera and a 2D coordinate space (404) representing the image plane of the depth camera are illustrated schematically. An induced plave 2D coordinate space (406) is also illustrated. As depicted in FIG. 4, a homography operator $H_p$ provides a mapping between the 2D coordinate space (402) representing the image plane of the high-resolution camera and the coordinate space (406) of the induced plane. Another homography operator $H_f$ can be used to provide a mapping between the 2D coordinate space (406) of the induced plane and the 2D coordinate space (404) representing the image plane of the depth camera.

More generally, a homography that provides the 2D-to-2D mapping between coordinate spaces of the two visual sensors—i.e., the depth and high-resolution cameras—is a multi-step homography that can include multiple homography operators. The mappings using a multi-step homography (including $H_p$ and $H_f$) according to some implementations can be represented as follows:

$$x' = H_p x = \begin{bmatrix} H_{p11} & H_{p12} & H_{p13} \\ H_{p21} & H_{p22} & H_{p23} \\ H_{p31} & H_{p32} & H_{p33} \end{bmatrix} \begin{bmatrix} u \\ v \\ 1 \end{bmatrix} = \quad (Eq.\ 5)$$

$$\left( \frac{H_{p11}u + H_{p12}v + H_{p13}}{H_{p31}u + H_{p32}v + H_{p33}}, \frac{H_{p21}u + H_{p22}v + H_{p23}}{H_{p31}u + H_{p32}v + H_{p33}} \right) = (u', v'),$$

$$x'' = \quad (Eq.\ 6)$$

$$H_p x' = \begin{bmatrix} H_{f11} & H_{f12} & H_{f13} \\ H_{f21} & H_{f22} & H_{f23} \\ H_{f31} & H_{f32} & H_{f33} \end{bmatrix} \begin{bmatrix} u' \\ v' \\ 1 \end{bmatrix} = \left( \frac{H_{f11}u' + H_{f12}v' + H_{f12}}{H_{f31}u' + H_{f32}v' + H_{f33}}, \right.$$

$$\left. \frac{H_{f21}u' + H_{f22}v' + H_{f23}}{H_{f31}u' + H_{f32}v' + H_{f33}} \right) = (u'', v''),$$

where x' corresponds to an intermediate mapped coordinate space (and more specifically the virtual coordinate space (406) of FIG. 4) based on $H_p$, and x" corresponds to a final mapped coordinate space based on $H_f$. Using Eqs. 5 and 6, the first set of 2D high-resolution corresponding points, x, is mapped onto the induced plane (406) to produce an induced set of coordinate points, x'. The induced set of coordinate points, x', is then mapped onto the 2D coordinate space (404) representing the image plane of the depth camera, producing a second set of coordinate points, x".

Figure 5:
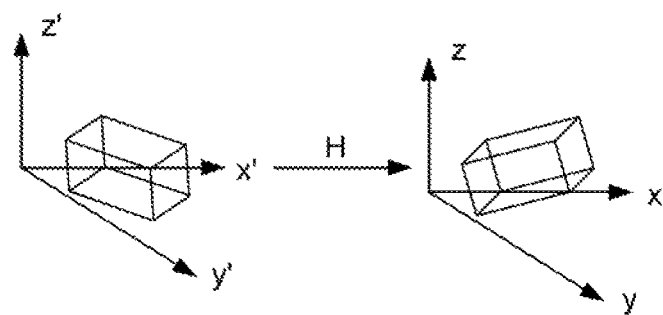
FIG. 5 illustrates the mapping of a 3D point cloud using a 3D homography operator, H.

The second set of coordinate points, x" is then used to extract depth information from the 3D point clouds. Specifically, because the depth information in the 3D point clouds is tied to a 2D coordinate system associated with the depth camera, there is a known pixel to pixel mapping between the depth data and the second set of coordinate points, x". In this manner, corresponding points from the first and second 3D point clouds can be obtained. The corresponding 3D points are then used to compute a 3D homography operator that allows the second 3D point cloud to be mapped to the first 3D point cloud. The two sets of 3D points can thus be aligned. Referring to FIG. 5, for example, a 3D homography operator H maps between 3D vectors $[U', V', Z']^T$ and $[U, V, Z]^T$. The 3D homography operator, in one example, may be calculated using the standard RANSAC algorithm, though other algorithms may be used.

The 3D homography step provides a coarse alignment of the pair of 3D point clouds. A more accurate alignment is obtained using a bundle adjustment step. The bundle adjustment minimizes the reprojection error between the image locations of observed and predicted points. In one example, the adjustment is formulated as a nonlinear least squares problem, where the error is the squared $L_2$ norm of the difference between the observed feature locations and the projections of the corresponding 3D points on the image of the camera. In a further example, standard or modified Levenberg-Marquardt algorithms may be used to iteratively solve the minimization problem.

Following alignment of the 3D point clouds, the resulting 3D mesh is pruned and cleaned—e.g., to remove spurious or unwanted points or to fill in holes or gaps. The mesh may then be refined as necessary, depending, for example, on the desired resolution or complexity of the object being scanned. Following the mesh pruning and refinement, the known pixel to pixel mapping between the depth data and coordinates of the image plane of the depth camera can be used to generate a modified set of coordinate points, x". Using the inverse of the homography operators $H_p$ and $H_f$, the modified set of coordinate points may then be mapped back to the coordinate system representing the image plane of the high-resolution camera.

Following completion of the above steps, the turntable then rotates a predetermined increment and the process repeats. More specifically, the turntable (302) is rotated the pre-determined increment (306) (e.g., 10 degrees) to a third position and a third 3D point cloud and 2D high-resolution image are obtained using the depth camera and high-resolution camera, respectively. The third 3D point cloud and 2D high-resolution image are then combined with the pruned and refined mesh and modified set of coordinate points, x", using the same steps described above. The process is repeated until the turntable has rotated a full 360 degrees or until the object desired to be digitized has been fully scanned.

Figure 6:
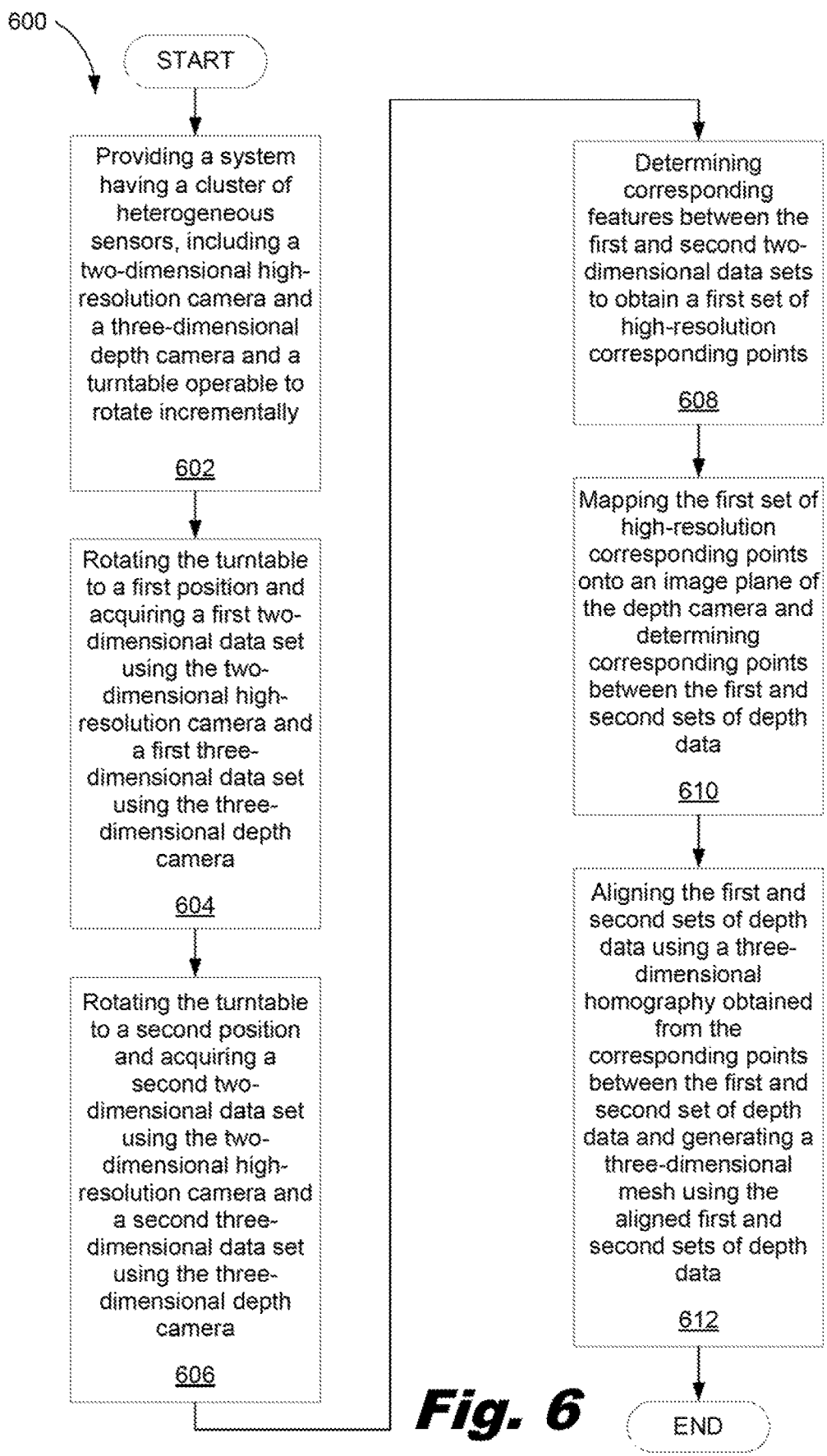
FIG. 6 is a flowchart of the operational steps of the scanning or digitizing process in one example using the principles discussed herein.

Referring now to FIG. 6, a method for reconstructing the surface geometry of a three-dimensional object according to the principles described herein is provided. In various examples, the method comprises the following steps. A system having a cluster of heterogeneous sensors, including a two-dimensional high-resolution camera and a three-dimensional depth camera and a turntable operable to rotate incrementally is provided (602). The turntable is rotated to a first position and a first two-dimensional data set is acquired using the two-dimensional high-resolution camera and a first three-dimensional data set is acquired using the three-dimensional depth camera (604). The turntable is then rotated to a second position and a second two-dimensional data set is acquired using the two-dimensional high-resolution camera and a second three-dimensional data set is acquired using the three-dimensional depth camera (606). Corresponding features between the first and second two-dimensional data sets are then determined to obtain a first set of high-resolution corresponding points (608). The first set of high-resolution corresponding points is then mapped onto an image plane of the depth camera and corresponding points between the first and second sets of depth data are determined (610). The first and second sets of depth data are then aligned using a three-dimensional homography obtained from the corresponding points between the first and second sets of depth data and the aligned data are then used to generate a three-dimensional mesh of the object (612).

Figure 7A:
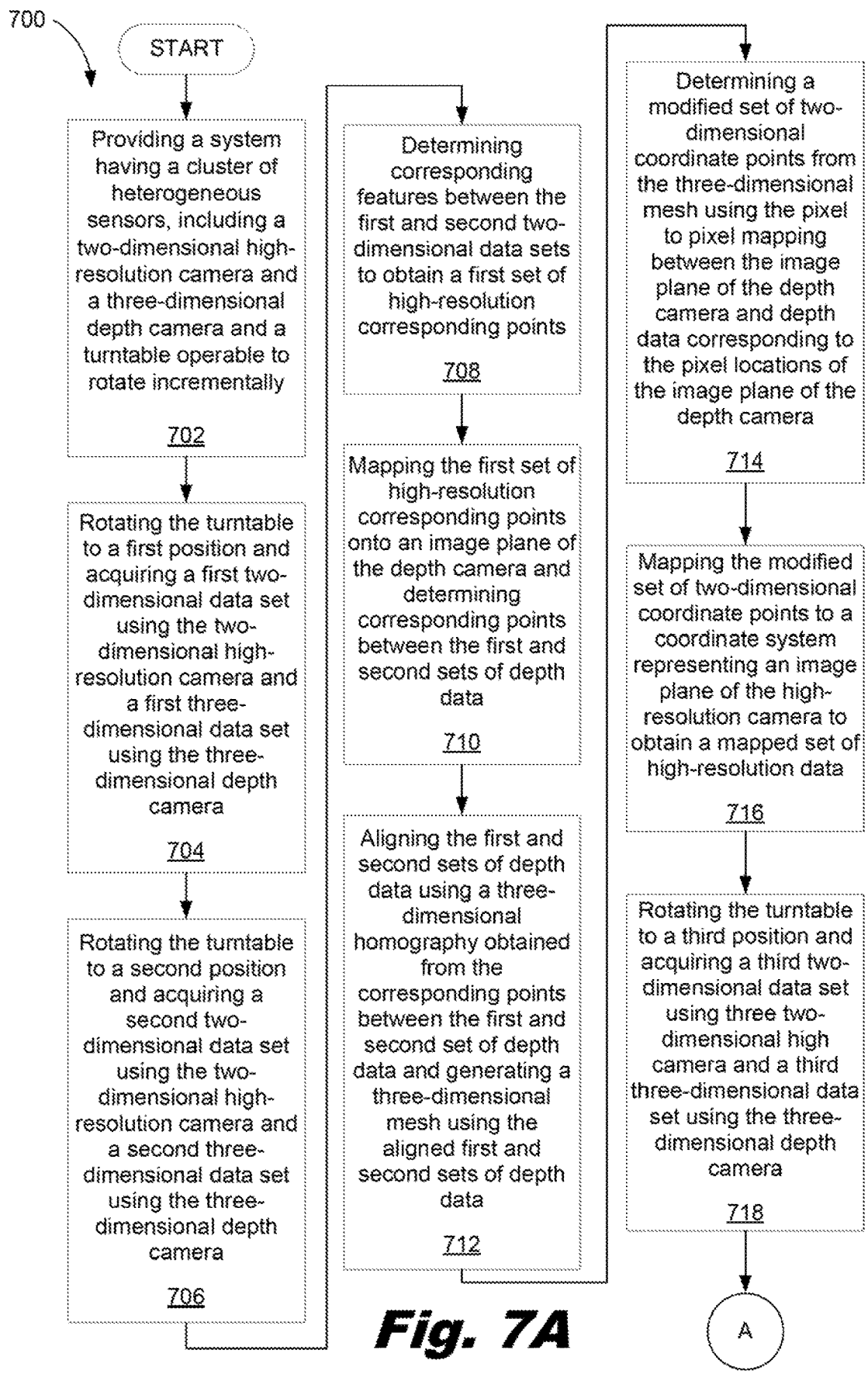
FIGS. 7A and 7B are flowcharts of the operational steps of the scanning or digitizing process in a further example using the principles discussed herein.
Figure 7B:
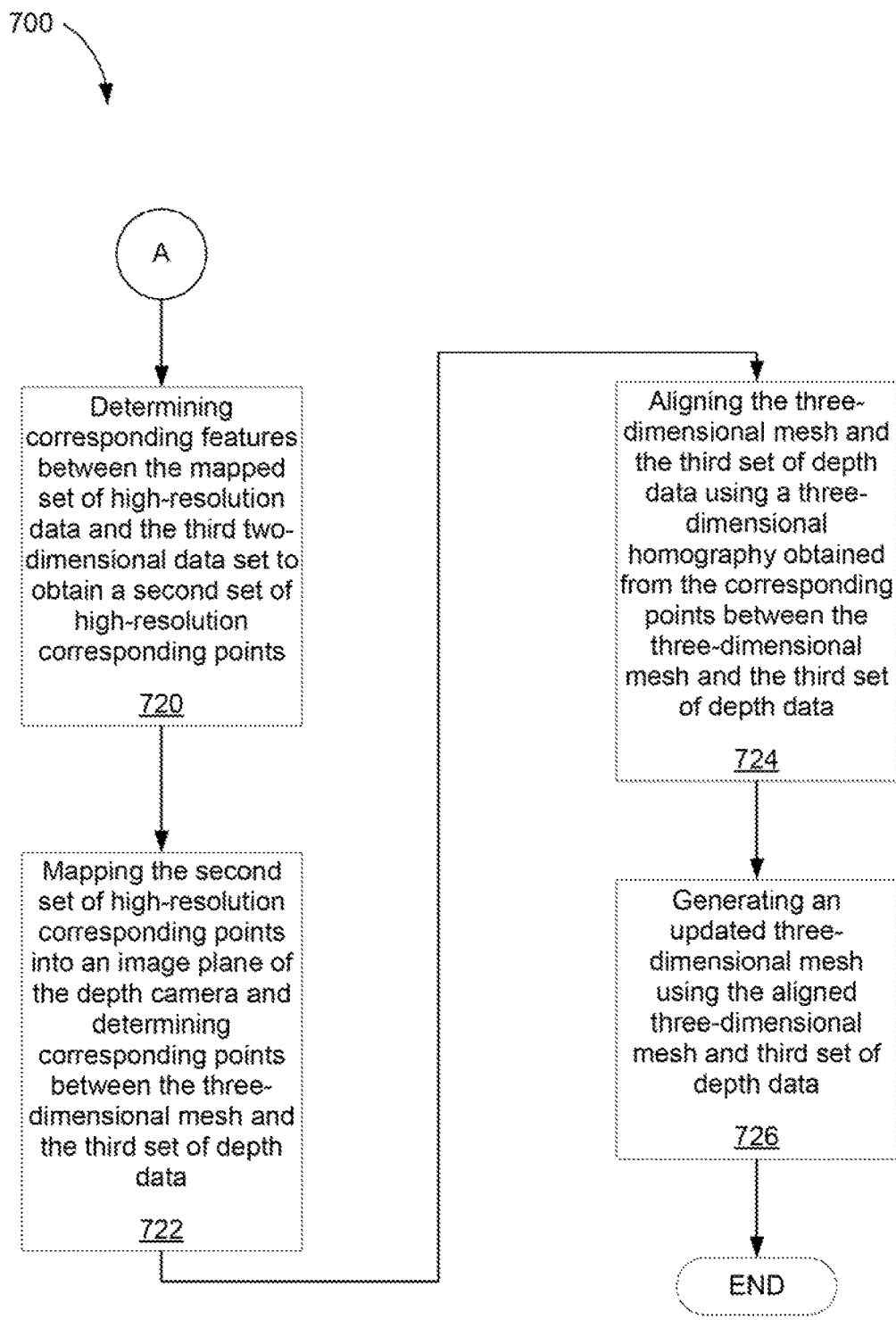

Referring now to FIGS. 7A and 7B, a method for reconstructing the surface geometry of a three-dimensional object according to the principles described herein is provided. In various examples, the method comprises the following steps. A system having a cluster of heterogeneous sensors, including a two-dimensional high-resolution camera and a three-dimensional depth camera and a turntable operable to rotate incrementally is provided (702). The turntable is rotated to a first position and a first two-dimensional data set is acquired using the two-dimensional high-resolution camera and a first three-dimensional data set is acquired using the three-dimensional depth camera (704). The turntable is then rotated to a second position and a second two-dimensional data set is acquired using the two-dimensional high-resolution camera and a second three-dimensional data set is acquired using the three-dimensional depth camera (706). Corresponding features between the first and second two-dimensional data sets are then determined to obtain a first set of high-resolution corresponding points (708). The first set of high-resolution corresponding points is then mapped onto an image plane of the depth camera and corresponding points between the first and second sets of depth data are determined (710). The first and second sets of depth data are then aligned using a three-dimensional homography obtained from the corresponding points between the first and second sets of depth data and the aligned data are then used to generate a three-dimensional mesh of the object (712).

Referring still to FIGS. 7A and 7B, the principles of the disclosure may include the following additional steps. A modified set of two-dimensional coordinate points is determined from the three-dimensional mesh using the pixel to pixel mapping between the image plane of the depth camera and depth data corresponding to the pixel locations of the image plane of the depth camera (714). The modified set of two-dimensional coordinate points is then mapped to a coordinate system representing an image plane of the high-resolution camera to obtain a mapped set of high-resolution data (716). The turntable is then rotated to a third position and a third two-dimensional data set is acquired using the two-dimensional high-resolution camera and a third three-dimensional data set is acquired using the three-dimensional depth camera (718). Corresponding features between the mapped set of high-resolution data and the third two-dimensional data set are then determined to obtain a second set of high-resolution corresponding points (720). The second set of high-resolution corresponding points are then mapped onto an image plane of the depth camera and corresponding points between the three-dimensional mesh and the third set of depth data are determined (722). The three-dimensional mesh and the third set of depth data are then aligned using a three-dimensional homography obtained from the corresponding points between the three-dimensional mesh and the third set of depth data (724). An updated three-dimensional mesh is then generated using the aligned three-dimensional mesh and third set of depth data (726). The process repeats until the desired scan or digitization is obtained.

The forgoing described principles and examples provide a system and method for reconstructing the shape or appearance of real world objects. The system and method benefit from reducing the 3D scanning problem to a simplified 2D to 2D correspondence problem, with alignment modeled as a 3D homography, leading to a fast and robust closed loop 3D scanning process.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A system for reconstructing a three-dimensional (3D) object, comprising:
   a cluster of heterogeneous sensors, including a two-dimensional (2D) high-resolution sensor and a 3D depth sensor;
   a turntable; and
   a calibration system including a processor and a storage medium storing calibration instructions executable on the processor to:
   when the turntable is at a first position, receive a first 2D data set of an object on the turntable acquired using the 2D high-resolution sensor, and a first 3D data set of the object on the turntable acquired using the 3D depth sensor;
   when the turntable is at a second position different from the first position, receive a second 2D data set of the object on the turntable acquired using the 2D high-resolution sensor, and a second 3D data set of the object on the turntable acquired using the 3D depth sensor;
   determine corresponding features between the first 2D data set and the second 2D data set to identify a set of high-resolution corresponding coordinate points;
   map the set of high-resolution corresponding coordinate points onto an image plane of the 3D depth sensor to identify a set of coordinate points;
   align the first and second 3D data sets using the set of coordinate points; and
   generate a representation of the 3D object using the aligned first and second 3D data sets.

2. The system of claim 1, wherein the 2D high-resolution sensor includes a high-resolution RGB camera.

3. The system of claim 2, wherein the 3D depth sensor includes a 3D depth camera having a pixel resolution lower than a pixel resolution of the high-resolution RGB camera.

4. The system of claim 1, wherein the turntable is operable to rotate incrementally.

5. The system of claim 1, wherein the generated representation of the 3D object comprises a mesh representing a geometry of the 3D object.

6. A non-transitory machine-readable storage medium comprising instructions that upon execution cause a system to:
   when a turntable that is rotatable incrementally is at a first incremental position, receive a first two-dimensional (2D) data set of an object on the turntable acquired using a 2D high-resolution sensor, and a first three-dimensional (3D) data set of the object on the turntable acquired using a 3D depth sensor;
   when the turntable is at a second incremental position different from the first incremental position, receive a second 2D data set of the object on the turntable acquired using the 2D high-resolution sensor, and a second 3D data set of the object on the turntable acquired using the 3D depth sensor;
   determine corresponding features between the first 2D data set and the second 2D data set to identify a set of high-resolution corresponding coordinate points;
   map the set of high-resolution corresponding coordinate points onto an image plane of the 3D depth sensor to identify a set of coordinate points;
   align the first and second 3D data sets using the set of coordinate points; and
   generate a 3D representation of the object using the aligned first and second 3D data sets.

7. The non-transitory machine-readable storage medium of claim 6, wherein the mapping of the set of high-resolution corresponding coordinate points onto the image plane of the 3D depth sensor uses a multi-step 2D homography.

8. The non-transitory machine-readable storage medium of claim 7, wherein the multi-step 2D homography uses a first homography operator that maps between a 2D coordinate space representing an image plane of the 2D high-resolution sensor and an induced plane, and a second homography operator that maps between the induced plane and a 2D coordinate space representing the image plane of the 3D depth sensor.

9. A method performed by a system comprising a hardware processor for reconstructing a surface geometry of a three-dimensional (3D) object, comprising:
   providing a cluster of heterogeneous sensors, including a two-dimensional (2D) high-resolution camera and a 3D depth camera;
   rotating a turntable to a first position and, while the turntable is at the first position, acquiring a first 2D data set of an object on the turntable using the 2D high-resolution camera and a first 3D data set of the object on the turntable using the 3D depth camera;

rotating the turntable to a second position and, while the turntable is at the second position, acquiring a second 2D data set of the object on the turntable using the 2D high-resolution camera and a second 3D data set of the object on the turntable using the 3D depth camera;

determining corresponding features between the first and second 2D data sets to obtain a first set of high-resolution corresponding points;

mapping the first set of high-resolution corresponding points onto an image plane of the 3D depth camera and determining corresponding points between a first set of depth data of the first 3D data set and a second set of depth data of the second 3D data set; and aligning the first and second sets of depth data using a 3D homography obtained from the corresponding points between the first and second sets of depth data.

10. The method of claim 9, further comprising using a multi-step two-dimensional homography to map the first set of high-resolution corresponding points onto the image plane of the 3D depth camera, the multi-step homography comprising mapping 2D to 2D correspondences of the first and second 2D data sets onto an induced plane to produce a set of induced coordinates and mapping the set of induced coordinates onto the image plane of the 3D depth camera.

11. The method of claim 10, further comprising extracting depth information from the 3D depth camera using a pixel to pixel mapping between the image plane of the 3D depth camera and depth data corresponding to pixel locations of the image plane of the 3D depth camera.

12. The method of claim 11, further comprising:
determining a 3D homography operator using the depth information extracted from a current and previous increment of the turntable;
aligning the depth information extracted from the current and previous increments of the turntable using the 3D homography operator; and
generating a 3D mesh representing the surface geometry of the 3D object from the aligned depth information.

13. A method performed by a system comprising a hardware processor for reconstructing a surface geometry of a three-dimensional (3D) object, comprising:
providing a cluster of heterogeneous sensors, including a two-dimensional (2D) high-resolution camera and a 3D depth camera;
rotating a turntable to a first position and, while the turntable is at the first position, acquiring a first 2D data set of an object on the turntable using the 2D high-resolution camera and a first 3D data set of the object on the turntable using the 3D depth camera;
rotating the turntable to a second position and, while the turntable is at the second position, acquiring a second 2D data set of the object on the turntable using the 2D high-resolution camera and a second 3D data set of the object on the turntable using the 3D depth camera;
determining corresponding features between the first and second 2D data sets to obtain a first set of high-resolution corresponding points;
mapping, using a multi-step two-dimensional homography, the first set of high-resolution corresponding points onto an image plane of the 3D depth camera and determining corresponding points between a first set of depth data of the first 3D data set and a second set of depth data of the second 3D data set, the multi-step homography comprising mapping 2D to 2D correspondences of the first and second 2D data sets onto an induced plane to produce a set of induced coordinates and mapping the set of induced coordinates onto the image plane of the 3D depth camera;

aligning the first and second sets of depth data using a 3D homography obtained from the corresponding points between the first and second sets of depth data;

extracting depth information from the 3D depth camera using a pixel to pixel mapping between the image plane of the 3D depth camera and depth data corresponding to pixel locations of the image plane of the 3D depth camera;

determining a 3D homography operator using the depth information extracted from current and previous increments of the turntable;

aligning the depth information extracted from the current and previous increments of the turntable using the 3D homography operator;

generating a 3D mesh representing the surface geometry of the 3D object from the aligned depth information;

determining a modified set of 2D coordinate points from the 3D mesh using the pixel to pixel mapping between the image plane of the 3D depth camera and the depth data corresponding to the pixel locations of the image plane of the 3D depth camera;

mapping the modified set of 2D coordinate points to a coordinate system representing an image plane of the 2D high-resolution camera to obtain a mapped set of high-resolution data;

rotating the turntable to a third position and acquiring a third 2D data set using the 2D high-resolution camera and a third 3D data set using the 3D depth camera;

determining corresponding features between the mapped set of high-resolution data and the third 2D data set to obtain a second set of high-resolution corresponding points;

mapping the second set of high-resolution corresponding points onto the image plane of the 3D depth camera and determining corresponding points between the 3D mesh and a third set of depth data;

aligning the 3D mesh and the third set of depth data using a 3D homography obtained from the corresponding points between the 3D mesh and the third set of depth data; and generating an updated 3D mesh using the aligned 3D mesh and third set of depth data.

14. The system of claim 1, wherein the calibration instructions are executable on the processor to determine, using the set of coordinate points, corresponding points between depth data in the first and second 3D data sets,
wherein the aligning of the first and second 3D data sets is based on the determined corresponding points between the depth data in the first and second 3D data sets.

15. The system of claim 14, wherein the aligning of the first and second 3D data sets is based on a 3D homography obtained from the determined corresponding points between the depth data in the first and second 3D data sets.

16. The system of claim 14, wherein the calibration instructions are executable on the processor to:
extract, using the set of coordinate points, the depth data from the first and second 3D data sets, the depth data in the first and second 3D data sets tied to the image plane of the 3D depth sensor such that a mapping exists between the depth data and the set of coordinate points.

17. The system of claim 1, wherein the mapping of the set of high-resolution corresponding coordinate points onto the image plane of the 3D depth sensor uses a 2D homography based on a first homography operator that maps between a 2D coordinate space representing an image plane of the 2D high-resolution sensor and an induced plane, and a second homography operator that maps between the induced plane and a 2D coordinate space representing the image plane of the 3D depth sensor.

18. The non-transitory machine-readable storage medium of claim 6, wherein the instructions upon execution cause the system to:
- determine, using the set of coordinate points, corresponding points between depth data in the first and second 3D data sets,
- wherein the aligning of the first and second 3D data sets is based on the determined corresponding points between the depth data in the first and second 3D data sets.

19. The non-transitory machine-readable storage medium of claim 18, wherein the aligning of the first and second 3D data sets is based a 3D homography obtained from the determined corresponding points between the depth data in the first and second 3D data sets.

20. The non-transitory machine-readable storage medium of claim 18, wherein the instructions upon execution cause the system to:
- extract, using the set of coordinate points, the depth data from the first and second 3D data sets, the depth data in the first and second 3D data sets tied to the image plane of the 3D depth sensor such that a mapping exists between the depth data and the set of coordinate points.

* * * * *